United States Patent Office 3,709,776
Patented Jan. 9, 1973

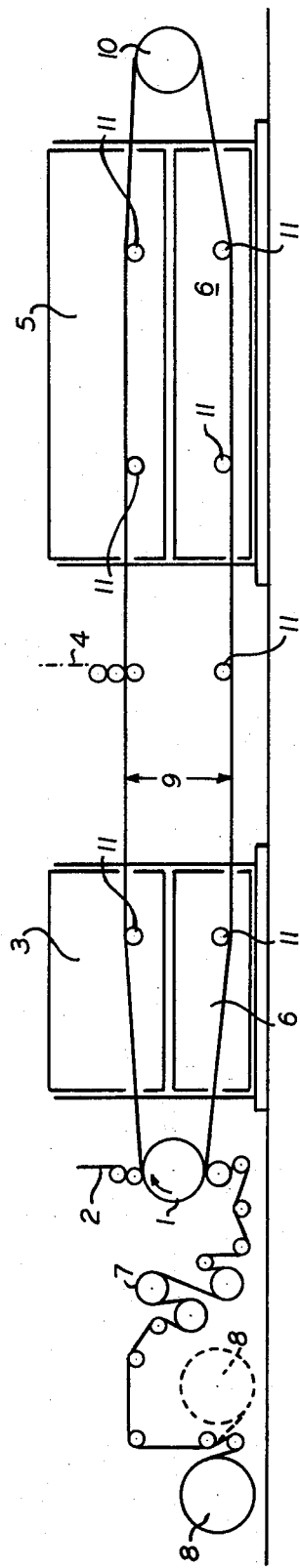

3,709,776
PROCESS FOR THE MANUFACTURE OF CEMENTABLE POLYVINYL FLUORIDE SHEETING
Otto Fuchs, Troisdorf-Oberlar, Gerhard Bier, Troisdorf, and Werner Trautvetter, Troisdorf-Oberlar, Germany, assignors to Dynamit Nobel AG, Troisdorf, Germany
Filed Dec. 10, 1970, Ser. No. 96,876
Claims priority, application Germany, Dec. 12, 1969,
P 19 62 329.1
Int. Cl. B32b 27/30, 27/40
U.S. Cl. 161—189                                         6 Claims

ABSTRACT OF THE DISCLOSURE

Improvements in the joining of polyvinyl fluoride shaped articles, particularly film or sheeting, to other materials by means of an intermediate adhesive by using a solution or dispersion of a vinyl fluoride polymer which has been postchlorinated to a chlorine content of 5 to 27 weight percent or a copolymer of vinyl fluoride and vinyl chloride having a vinyl chloride content of 10 to 65 weight percent as the cement.

---

This application relates to polyvinyl fluoride. It more particularly refers to an improved technique for joining sheets, films or other shaped articles of polyvinyl fluoride to another material through an adhesive.

Sheets, films and other articles made of polyvinyl fluoride (PVF) have very good resistance to weathering and corrosion. Therefore they are well suited for use as duplexing or facing materials to protect other supporting materials exposed to such influences. The use of polyvinyl fluoride for this purpose, however, is impeded by the inherent characteristics of untreated sheet materials thereof. They can be welded to one another but they do not bond to any appreciable extent with adhesives and hence will adhere poorly if at all to supporting materials in need of protection. These substrates (supporting materials) include plastics, metals, building materials, wood and cellulose. In fact, this inability of the untreated polyvinyl fluoride film or sheeting to adhere to such supporting materials is exploited by using it as a separating or parting film.

The resistance of untreated polyvinyl fluoride film and sheeting to cementing is displayed both by sheets made by the solvent casting process and by those made by other known manufacturing processes such as rolling, extruding or blowing. For example, it has been found that polyvinyl fluoride film and sheeting made in a prior-art manner by known solvent casting processes, by spreading a polyvinyl fluoride dispersion on flat glass or polished metal surfaces and then evaporating and completely removing the solvent or dispersant by the action of heat, cannot be cemented to other substrates after the removal of the film or sheet from the glass or polished metal casting surface.

It has heretofore been proposed to provide temperature-resistant supporting materials with a polyvinyl fluoride covering by applying a polyvinyl fluoride dispersion onto the surfaces of these materials and then baking the polymer on. This process, however, can be used only with substrate materials which withstand elevated temperatures, such as metals, for example.

Application Ser. No. 72,475, filed Sept. 15, 1970, in the name of Otto Fuchs, describes and claims an improved technique for adhesively joining a polyvinyl fluoride sheet or film made by a solvent casting process to another substrate. In this improved process, cementable PVF sheets are made by a solvent or dispersant casting process in which the sheet as cast is made to set incompletely by evaporating away the solvent or dispersant only down to a residual content of 0.4 to 0.8 weight percent, preferably 0.5 to 0.6 weight percent. This sheet is then provided, on the side that is to be cemented, with an adhesive coating which is stable at elevated temperatures and yields a drying film. The remainder of the solvent or dispersant is then evaporated from the film or sheet.

It is an object of this invention to further improve the art of adhesively joining a polyvinyl fluoride film or sheet to a substrate through an adhesive.

It is another object of this invention to provide a novel adhesive for polyvinyl fluoride film or sheeting.

It is a further object of this invention to provide a novel polyvinyl fluoride/adhesive/substrate laminate.

Other and additional objects of this invention will become apparent from a consideration of this entire specification including the claims hereof.

In accord with and fulfilling these objects, one aspect of this invention resides in a novel adhesive for polyvinyl fluoride shaped articles. This adhesive is a dispersion or a solution either of postchlorinated polyvinyl fluoride with a chlorine content of 5 to 27 weight percent or of a copolymer of vinyl fluoride and vinyl chloride having a vinyl chloride content of 10 to 65 weight percent, or both.

Another aspect of this invention resides in the technique of adhering preformed polyvinyl fluoride film or sheeting to a suitable substrate forming the polyvinyl fluoride film or sheeting by a solvent or dispersant coating technique wherein the solvent or dispersant is removed from the cast film or sheeting only to an extent sufficient to leave a residual solvent or dispersant content of 0.4 to 0.8 weight percent, preferably 0.5 to 0.6 weight percent, in the film or sheeting; providing the novel adhesive described herein on the side of such film or sheeting to be adhered; and then removing the solvent or dispersant from the film or sheeting as well as from the adhesive.

Understanding of this invention will be facilitated by reference to the drawing which is a side elevation schematic view of the process of this invention.

Polyvinyl fluoride film or sheeting pretreated in the above manner which can be cemented very strongly to other materials by the use of the cements used in the prior art (for example, polyurethanes) for cementing to these materials have now been found to have significantly improved adhesion, at least in so far as long-term weathering resistance is concerned, where the chlorinated vinyl fluoride polymers of this invention are used as the adhesive base.

The postchlorinated polyvinyl fluoride used as the adhesion-mediating cement has a chlorine content between 5 and 27 weight percent. A postchlorinated PVF of this kind can be prepared in a known manner by suspension chlorination in water or dilute hydrochloric acid by the introduction of chlorine into the suspensions with simultaneous exposure to light. The postchlorination of polyvinyl fluoride polymer is effectuated in the same manner as known from PVC.

Copolymers of vinyl fluoride and vinyl chloride are within the scope of this invention as adhesives for polyvinyl fluoride film or sheeting. These copolymers can be prepared by known techniques which do not form a part of this invention. Reference should be had to German patent application P 17 70 059.8 for a description of one such copolymerization in which excess gaseous vinyl chloride and vinyl fluoride are copolymerized at elevated temperature and pressure in contact with a catalyst such as azo-bis-iso-butyramidine hydrochloride or compounds containing active iodine. The ratio of the vinyl chloride to the vinyl fluoride starting materials is to be between 7:3 and 6:4 in so far as possible, and it is desirable during the polymerization to inject additional gaseous vinyl fluoride into the reaction chamber.

The vinyl fluoride content in the copolymer is to amount to at least 35 weight percent, and the percentage of vinyl chloride in the copolymer is to be between 10 and 65 weight percent.

The solvent or dispersing agent for the post-chlorinated polyvinyl fluoride or for the copolymer of vinyl chloride and vinyl fluoride, as the case may be, should if possible have a boiling point that is above the temperature to which the polyvinyl fluoride sheet is cooled after the evaporation of the main part of the solvent contained in the sheet from the solvent or dispersant casting process. It is also important that the solvent used in forming the sheeting be compatible with the solvent of the cement. It is therefore desirable to use, in so far as possible, as the solvent for the cement the same solvent that was used in the manufacture of the sheeting.

Dimethylformamide or propylene carbonate are preferred as solvents or dispersants for postchlorinated polyvinyl fluoride and for the vinyl fluoride/vinyl chloride copolymer. Substantially any other solvent which dissolves polyvinyl fluoride is suitable. In general it can be said that the higher the chlorine content of the vinyl fluoride polymer is, the greater its solubility will be.

The adhesive of this invention can be applied to the surface of the not yet entirely solvent-free sheeting by spreading, spraying, or other methods of the prior art. In order to make the sheeting adherent by the process of this invention, the adhesive layer should be as thin as possible. It would suffice for the layer of dry adhesive film on the polyvinyl fluoride sheeting to have a thickness of only a few molecules. In the commonly used application methods mentioned above, enough adhesive solution or suspension is applied to produce a coherent film of the order of magnitude of approximately 1 micron after drying. Thicker layers of adhesive film still produce an adherent sheet, but they do not produce any improvement in the adhesiveness of the polyvinyl fluoride sheeting. Adhesive thicknesses, however, do not limit this invention.

The preparation of adhesive polyvinyl fluoride sheets according to the invention can be performed either by a continuous or by a discontinuous process. In both processes a solution or dispersion of the polyvinyl fluoride in a latent solvent is used. Suitable latent solvents include N-alkyl-substituted, lower, aliphatic carboxylic acid amides, such as N,N-dimethylformamide, N,N-dimethylacetamide, N,N-diethylformamide, N,N-dimethyl-$\gamma$-hydroxyacetamide, N,N-dimethyl-$\gamma$-hydroxybutyramide, N,N-dimethyllactamide, N,N-dimethylmethoxyacetamide, N-methylformamide or N-methylacetamide. Also suitable are compounds containing carbonyl groups, examples being acetophenone, acetylacetone, cyclohexanone, bis-(methoxymethyl)-urone, 2-piperidone, N-methyl-2-piperidone, N-ethyl-2-pyrrolidone, N-methyl-2-pyrrolidone, N-isopropyl-2-pyrrolidone or 5-methyl-2-pyrrolidone.

Cyclic esters of carbonic acid are also suitable as latent solvents, examples being ethylene carbonate, propylene carbonates, butylene carbonates or trimethylene carbonate. Also, lactones such as $\beta$-propiolactone, $\delta$-valerolactone, $\gamma,\gamma$-dimethyl-$\delta$-valerolactone, $\gamma$-valerolactone, $\gamma$-butyrolactone and its $\beta$- and $\gamma$-substituted alkyl derivatives, $\alpha$- and $\beta$-angelicalactone, $\epsilon$-caprolactone, etc. Also suitable are dialkyl esters of preferably di lower alkyl, e.g., $C_1$-$C_8$ esters, of phthalic acid, quinoline, isoquinoline, pyridine and tetramethylurea.

Propylene carbonate N,N-dimethylformamide, isophorone or $\gamma$-butyrolactone and mixtures thereof are preferred as latent solvents.

In preparing solutions or dispersions suitable for the production of polyvinyl fluoride film, first a concentrated, thick paste is made by mixing the polymer and a part of the solvent; this paste is homogenized by several passes through a roller mixer; the homogenized paste is then thinned with the rest of the solvent, and the thinned solution or dispersion is finally treated with a vacuum to remove air which may be dissolved therein.

In the discontinuous process, the paste or solution thus made is applied to a glass plate or to a polished, degreased metal sheet and heated until all but about 0.4 to 0.8 weight percent of the solvent has been removed from the jelled sheet. The temperature applied during this removal of most of the solvent is governed by the boiling temperature of the solvent or solvent mixture. It is desirable, however, to perform the heating at an oven temperature of 240 to 280° C. at which temperature the heating time amounts to about 1½ to 2 min.

Then the sheet is cooled to a temperature at which it has solidified to such an extent that it is self-supporting and sturdy enough to be handled mechanically. Generally this is the case at temperatures below about 90 to 100° C. Unless special conditions make it inadvisable, the sheet should be cooled to temperatures between about 80 and 90° C., so that when the sheet is next heated, which is after it has been coated with the adhesive solution or suspension, this heating can be started at a higher temperature level, thereby requiring a lower power input. It is, of course, possible to cool the sheet down to room temperature and to apply the adhesive coating to such a cooled sheet. This is recommendable when the solvent used in the adhesive has a boiling point between 30 and 80° C., so that it will not evaporate immediately upon the application of the adhesive to the still hot sheet.

After the application of the adhesive, the sheet is heated again in order to drive out the remainder of the solvent or dispersant. It is again desirable to heat the coated sheeting in an environment having temperatures between about 240 and 280° C. for this purpose if it is desired to avoid heating for too long a time. At this oven temperature the remainder of the solvent, as well as the solvent for the adhesive, is driven out after about twice the amount of time required for the first heating.

After the final cooling, the sheet having a layer of adhesive thereon according to the invention can be wound into rolls, and is capable of being cemented to wood, plastics or metals.

The process of the invention can be performed continuously by applying the polyvinyl fluoride dispersion by means of an applicator mechanism to a metal band circulating in a sheet solvent casting machine, and heating it by means of a preliminary heating tunnel to such an extent that the latent solvent sets the polyvinyl fluoride and then mostly evaporates but a very small amount of solvent remains in the surface and keeps the polyvinyl fluoride film in a still slightly softened state. The time for which the heat is applied amounts in this case to about half of the time that is required for the production of a finished, ready-to-use, solvent-free cast film containing no more than slight residues of solvent ($\leq 0.5\%$) which would represent the final state of the film in which it would be no longer cementable. After running through the preliminary heating tunnel, the film runs through a short cooling area in which the surface of the sheet is cooled down to the point that it is sufficiently solid to receive a thin coating of the adhesive made from postchlorinated polyvinyl fluoride or vinyl fluoride/vinyl chloride copolymer. Then the sheet passes on the metal band through a second, main heating tunnel which is twice as long as the preliminary heating tunnel, and in which substantially all of the solvents are completely removed from the film as well as from the adhesive by evaporation. After cooling, the polyvinyl fluoride sheet is removed from the metal band. It can be wound into rolls, and stored, and can be joined to other materials very well at the adhesive treated surface. This can be by means of additional adhesive applied to the chlorine containing polyvinyl fluoride surface. The side of the sheet that was against the metal represents the outer side of the sheet and can be given a very glossy or mat appearance as desired, according to the kind of surface that is on the metal.

The adhesives used in making the adhesive coating can, if desired, contain small amounts of finely divided silicon dioxide or other known fillers which improve the wettability of the sheet and give thixotropic properties to the adhesive solution or suspension.

The adhesives applied to the sheet before the evaporation of the residual solvent may also contain, if desired, agents to stabilize them against thermal stresses in case the heating of the adhesive coated sheet to evaporate the residual solvent should be performed at excessively high temperatures or for excessively long periods of time. Small quantities of organic tin compounds are preferred for this purpose, such as dialkyl tin maleic acid esters of the general formula:

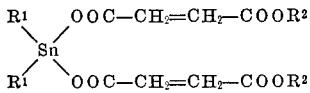

wherein $R^1$ = alkyl radicals having 4–10 C atoms, and
$R^2$ = alkyl radicals having 6–10 C atoms.

This invention will be illustrated by the following examples which are in no way limiting on the scope of this invention. Parts and percentages are by weight unless expressly stated to the contrary.

EXAMPLE (for purposes of comparison)

A polyvinyl fluoride dispersion was prepared from 40 parts of polyvinyl fluoride powder with a K value of 77 and 60 parts of propylene carbonate solvent in the following manner: The polyvinyl fluoride is first mixed with a portion of the solvent, then homogenized in a roller mixer, and then the paste mixed with the rest of the propylene carbonate. The dispersion, from which the included air was removed by vacuum treatment, is then spread on a flat, polished plate and heated for 3 minutes in a circulating hot air oven at 260° C. After cooling, the polyvinyl fluoride sheet was stripped from the metal plate.

The top side of the polyvinyl fluoride sheet was spread with a composition consisting of a mixture of 5 parts of a 70% solution of a polyester urethane in ethyl acetate and methylene chloride in a 1:1 ratio; 2.5 parts of a 75% solution of the reaction product of 1 mole of trimethylol propane and 3 moles of toluylenediisocyanate in ethyl acetate and 5 parts of cyclohexanone. Then the solvent was evaporated at 120° C., cross-linking was initiated, and strips of the sheet material were applied to a variety of cleaned supporting materials, especially rigid polyvinyl chloride. The adherence of the sheeting to all of the supporting materials measured must be pronounced poor, even after relatively long pressing and long storage. The sheeting can easily be stripped off.

EXAMPLE 1

From a dispersion consisting of 80 parts polyvinyl fluoride, 20 parts titanium dioxide pigment filler and 150 parts propylene carbonate solvent, white-pigmented polyvinyl fluoride sheets were prepared as described in the Comparative Example. Heating in the circulating air oven was performed at 260° C. for no more than 90 seconds in the first stage; and, after a brief cooling period, the sheets were coated with a dispersion of postchlorinated polyvinyl fluoride in propylene carbonate. The postchlorinated polyvinyl fluoride had a chlorine content of 6.7%. In other tests, the postchlorinated polyvinyl fluoride had a chlorine content of 10.8 weight percent, 11.1 weight percent, and 22.6 weight percent. Then the solvents were completely evaporated by heating for 3 minutes at 260° C. in a circulating air oven.

The dry sheets thus produced were cemented in the following manner to rigid polyvinyl chloride, wood, and vulcanized fiber.

(a) On the side of the sheet onto which the postchlorinated polyvinyl fluoride was applied, a cement was spread which consisted of a mixture of 7 parts of a 70% solution of a polyester containing urethane groups in ethyl acetate and methylene chloride in a 1:1 ratio, 5 parts of a 75% solution in ethyl acetate of the reaction product of 1 mole of trimethylol propane with 3 moles of tolylene diisocyanate and 10 parts of cyclohexanone. After application of the cement solution to the sheet, the solvents were evaporated from this mixture at 120° C., the crosslinking reaction was started, and the sheet was pressed onto the supporting material.

(b) The side of the sheet that was pretreated with postchlorinated polyvinyl fluoride was coated with a cement consisting of 5 parts of a 70% solution of a polyester containing urethane groups in ethyl acetate and methylene chloride in a 1:1 ratio. 4 parts of a 75% solution in ethyl acetate of the reaction product of 1 mole of trimethylol propane with 3 moles of toluylene diisocyanate, and 4 parts cyclohexanone. The rest of the procedure was the same as described under (a) above.

In both cases the strength of adhesion of the bond exceeded the tensile strength of the polyvinyl fluoride sheet.

(c) The side of the sheet that was pretreated with postchlorinated polyvinyl fluoride was coated with a solution of a copolymer of 87 weight percent vinyl chloride, 12 weight percent vinyl acetate and 1 weight percent maleic acid in cyclohexanone. Then the solvent was evaporated and the sheet was applied under pressure at 120° C. with the cement-coated side against a rigid polyvinyl chloride panel. At the same time embossing was performed by using a textured press platen. The laminated sheet could not be removed mechanically from the rigid polyvinyl chloride.

EXAMPLE 2

White-pigmented polyvinyl fluoride sheets were prepared from a dispersion consisting of 80 parts polyvinyl fluoride, 20 parts titanium dioxide, and 150 parts propylene carbonate solvent, as described in Example 1. The heating in the circulating air oven at 260° C. was again performed for 90 seconds in the first stage; and after a brief cooling period, the sheets were coated with a 20% solution of a copolymer of 65 weight percent vinyl chloride and 35 weight percent vinyl fluoride in dimethylformamide. Then the solvents were completely evaporated in the circulating air oven at 260° C.

For cementing of this sheet thus pretreated to supporting material, the first test consisted of applying to a rigid polyvinyl chloride panel a solution of a copolymer of 87 weight percent vinyl chloride, 12 weight percent vinyl acetate, and 1 weight percent maleic acid in cyclohexanone. After this cement had dried on the panel surface, the treated side of the polyvinyl fluoride sheet was applied to it and the sheet was laminated under pressure at 120° C. The bond was substantially indestructible.

In a second test, a sheet produced and treated in the same manner was coated on the treated side with the same cement solution and bonded to a rigid polyvinyl panel in a press at 5 atmospheres gauge pressure and 120° C., using distance pieces for limiting the compression. By the use of a textured press platen a textured surface was simultaneously produced on the other side of the sheet. The polyvinyl fluoride sheet could not be removed from the rigid polyvinyl chloride.

EXAMPLE 3

Referring now to the drawing, a pigmented and deaerated polyvinyl fluoride dispersion of 20 parts polyvinyl fluoride, 20 parts titanium dioxide pigment, and 250 parts propylene carbonate solvent, prepared as described in the comparative example, is applied by means of the reverse roll coated 2 to the circulating metal band 9 in a film casting machine and passed through a hot air preliminary heating tunnel 3 at a temperature of 260° C. The metal band circulates over the drive roll 1, the tension roll 10 and the band support rollers 11. The time of stay in the preliminary heating tunnel amounts to 90 sec. In this tunnel the polyvinyl fluoride stiffens and most of the solvent is evaporated and carried out with the exhaust hot air. After leaving the tunnel the band runs through a short cooling section of approximately the same length as the preliminary heating tunnel, where additional air cooling can be used.

After the surface of the sheet, which still contains some solvent, has sufficiently cooled in this area and become solid enough to be coated without harm, 5% solutions of postchlorinated polyvinyl fluoride (containing 7 weight percent chlorine in one case and 13 weight percent chlorine in the other) in propylene carbonate were applied by means of a second applicator mechanism 4. Then the sheet traveled on the metal band through a second, main heating tunnel 5 which is twice as long as the preliminary heating tunnel and is also heated with hot air at 260° C., the time of stay being approximately 3 to 3.5 minutes. When the band is cooled by returning through an air-cooling tunnel 6, with the additional use of a cooling roll 7 if necessary, the now cementable sheet is stripped from the metal band and wound up on the rolls 8. With the sheets manufactured in this continuous manner, the supporting materials can be covered in the same manner as described in Examples 1 and 2. The bond between the sheet and the supporting material cannot be destroyed mechanically.

What is claimed is:

1. A laminate comprising a polyvinyl fluoride film or sheet having within its surface a copolymer of vinyl fluoride and 10 to 65% vinyl chloride and another material joined to said polyvinyl fluoride film or sheeting containing said copolymer through a second polymeric adhesive.

2. A laminate as claimed in claim 1, wherein said copolymer has 35% vinyl fluoride.

3. A laminate as claimed in claim 1, wherein said second adhesive is a polyester urethane.

4. A laminate of polyvinyl fluoride film or sheeting, a postchlorinated polyvinyl fluoride polymer within the surface of said polyvinyl fluoride and another material laminated to said chlorine containing surface through a second polymeric adhesive.

5. A laminate as claimed in claim 4, wherein said postchlorinated polyvinyl fluoride has a chlorine content of 5 to 27%.

6. A laminate as claimed in claim 4, wherein said second adhesive is a polyester urethane.

References Cited

UNITED STATES PATENTS

| | | | |
|---|---|---|---|
| 2,774,704 | 12/1956 | Smith | 161—189 |
| 2,809,130 | 10/1957 | Rappaport | 161—189 |
| 3,111,450 | 11/1963 | Stevens | 161—189 |
| 3,133,854 | 5/1964 | Simms | 161—189 |
| 3,265,556 | 8/1966 | Hungerford et al. | 161—189 |
| 3,538,055 | 11/1970 | Camilleri et al. | 161—190 X |
| 3,581,779 | 6/1971 | Sylvia | 161—189 X |
| 3,616,187 | 10/1971 | Ottmann et al. | 161—189 |
| 3,616,192 | 10/1971 | Sinclair | 161—190 X |
| 3,642,570 | 2/1972 | Bacskai | 161—189 |

HAROLD ANSHER, Primary Examiner

U.S. Cl. X.R.

161—188, 190